No. 649,198. Patented May 8, 1900.
W. C. EGERTON.
TIME INDICATOR.
(Application filed July 5, 1899.)

(No Model.)

WITNESSES:
P. McComb
Robert A. Williams

INVENTOR
William C. Egerton
BY
Rufus King
ATTORNEY

UNITED STATES PATENT OFFICE.

WILLIAM C. EGERTON, OF NEW YORK, N. Y., ASSIGNOR TO LOUISE H. McCLELLAND, OF SAME PLACE.

TIME-INDICATOR.

SPECIFICATION forming part of Letters Patent No. 649,198, dated May 8, 1900.

Application filed July 5, 1899. Serial No. 722,885. (No model.)

*To all whom it may concern:*

Be it known that I, WILLIAM C. EGERTON, a citizen of the United States, and a resident of New York, county of New York and State of New York, have invented certain new and useful Improvements in Time-Indicators, of which the following is a specification, reference being had to the accompanying drawings, forming a part thereof, in which similar letters of reference indicate corresponding parts.

My invention relates to an improved and novel article of manufacture; and its object is to provide a cheap, ornamental, and convenient device for determining the time at any moment in various parts of the world. I attain this object by the device illustrated in the accompanying drawings, in which—

Figure 1:
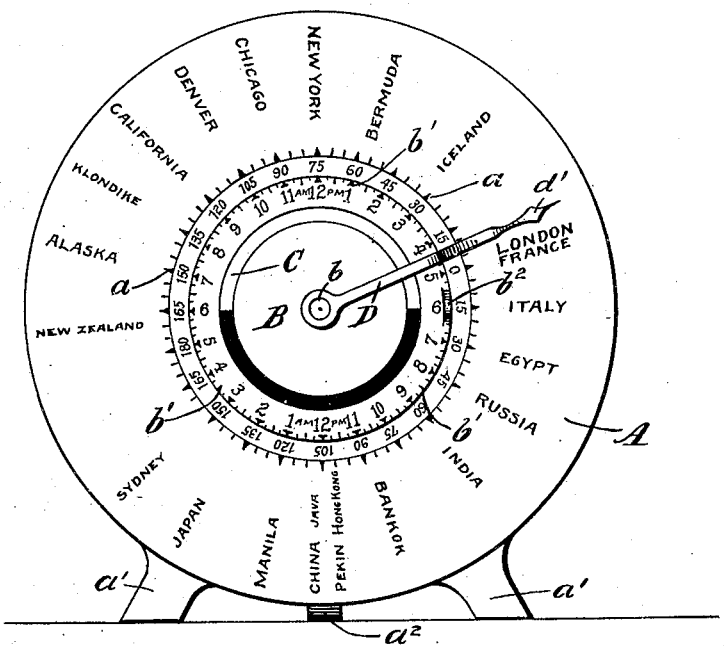
Figure 2:
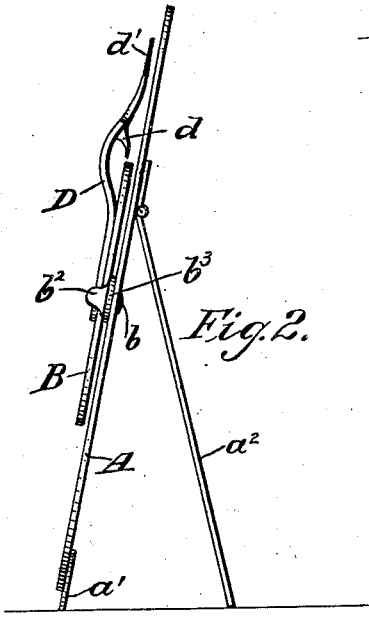
Figure 3:
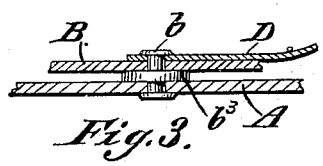
Figure 4:
Figure 5:
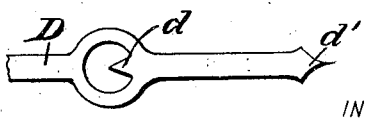

Figure 1 is a general front view of the device. Fig. 2 is a side view of same. Fig. 3 is a detail view showing the method of connecting the revolving parts. Fig. 4 is a view of the connecting-pivot, and Fig. 5 shows a slight modification of index on arm.

Similar letters refer to similar parts throughout the drawings.

In the practice of my invention I provide a dial A with markings $a$, representing degrees of longitude east and west of London. The mark opposite London indicates 0 degrees, and moving around on the circle to east and west every fifteenth degree is numbered. The space between each mark represents five degrees.

At various points around the dial A are marked different cities and localities of the world, each city or locality being opposite its proper degree-mark.

Concentrically fastened to the dial A by means of the pivot $b$ is a second dial B. The dial B is provided with markings $b'$, which indicate hours, half-hours, and quarter-hours. The dial B is further marked with the circular band C, half of which is shaded and which indicates that all places radially opposite said shaded portion are in darkness when the device is set for a reading.

A small lug $b^2$ is formed upon the dial B and is employed as a key for revolving said dial B. Pivotally fastened at the center is an indicating arm or pointer D. Said arm has an index $d$ formed upon its under side, which is employed in conjunction with the markings $b'$ to read the time at the place designated by the end $d'$ of the pointer D.

The connecting-pin $b$ is formed with a circular flange $b^3$ and forms a bed for the dial B. The parts are all fastened together, so as to revolve about the pivot $b$.

The dial A is provided with the legs $a'$ and the hinged leg $a^2$, which afford means for standing the device in an upright position.

The device operates as follows: The dial B is set with "12" on line with New York. If it is desired to determine the time on the device at Alaska, the indicating-arm is swung around so that the point $d'$ comes in line with Alaska, and the time that it is at Alaska when it is twelve noon at New York would then be shown on the dial B, radially opposite the index $d$ on the arm D—viz., seven a. m. In the same manner the time at any locality may be determined at any time of the day.

In the drawings I illustrate a construction for a metallic device; but it is obvious that the device may be constructed of paper or any other suitable material. If paper is used, the arm D would necessarily have to be flat, and the index could be formed as shown in Fig. 5. In connecting the parts the common eyelet-fastening would have to be employed.

The legs $a'$ and $a^2$ may be omitted and the entire device be circular in shape.

Having thus described my invention, what I claim as new, and desire to secure by Letters Patent, is—

The combination, in a time-indicator, embodying a dial provided with suitable markings representing localities, and a secondary dial B concentrically mounted upon said dial and provided with numerical markings representing time, of an indicating-arm D mounted concentrically with said dials, indexes $d$ and $d'$ formed upon said arm D, a rivet formed with a ledge $b^3$ and adapted to hold dials and arm in position in such a manner so that the secondary dial B does not set directly upon the dial A, and a lug $b^2$ formed upon the secondary dial B to afford a means for revolving secondary dial, substantially as described.

In testimony that I claim the foregoing as my invention I have signed my name, in presence of two witnesses, this 1st day of July, 1899.

WILLIAM C. EGERTON.

Witnesses:
 CHARLES E. CLARKE,
 B. McCOMB.